United States Patent [19]

Shimizu et al.

[11] 4,394,416
[45] Jul. 19, 1983

[54] FILM-PAPER FIBER LAYER LAMINATE AND PROCESS FOR PREPARATION THEREOF

[75] Inventors: Yoshikazu Shimizu, Amagasaki; Kathuhiro Yamaguchi, Osaka, both of Japan

[73] Assignee: Azona Co., Ltd., Kobe, Japan

[21] Appl. No.: 267,380

[22] Filed: May 26, 1981

Related U.S. Application Data

[62] Division of Ser. No. 213,642, Dec. 5, 1980, abandoned.

[30] Foreign Application Priority Data

Dec. 12, 1979 [JP] Japan .............................. 54-161150

[51] Int. Cl.$^3$ .................... B32B 27/10; B32B 27/28
[52] U.S. Cl. ................................ 428/341; 156/238; 156/241; 156/249; 156/254; 156/279; 428/412; 428/473.5; 428/479.6; 428/481; 428/496; 428/511; 428/513; 428/514; 428/537
[58] Field of Search ............... 428/219, 511, 513, 481, 428/479.6, 473.5, 478.6, 514, 537, 341, 412, 496; 156/254, 238, 241, 249, 279

[56] References Cited

U.S. PATENT DOCUMENTS

| | | | |
|---|---|---|---|
| PP. 80,036 | 6/1943 | Fischer | 156/254 |
| 1,323,021 | 11/1919 | Crowell | 156/254 |
| 1,758,502 | 5/1930 | Crowell | 156/254 |
| 3,690,985 | 9/1972 | Price | 156/254 |
| 3,837,946 | 9/1974 | Gribbin | 156/254 X |
| 4,242,418 | 12/1980 | Kilagawa | 428/511 X |
| 4,269,937 | 5/1981 | Aeanuma et al. | 428/511 X |
| 4,341,839 | 7/1982 | Shaw et al | 428/511 X |

Primary Examiner—Thomas J. Herbert, Jr.
Attorney, Agent, or Firm—Armstrong, Nikaido, Marmelstein & Kubovcik

[57] ABSTRACT

Disclosed is a film-paper fiber layer laminate comprising a film and a very thin paper fiber layer bonded to the surface of the film. This laminate is prepared by bonding films to both surfaces of a paper so that the adhesive bond strength between the film and the paper is higher than the failure strength of the paper fiber layer and separating the films by delamination. This film-paper fiber layer laminate is excellent in the transparency and dimension stability, and the tearing strength of the film per se is completely retained and the laminate is suitably used as a tracing paper.

3 Claims, 3 Drawing Figures

FILM-PAPER FIBER LAYER LAMINATE AND PROCESS FOR PREPARATION THEREOF

This is a division, of application Ser. No. 213,642, filed Dec. 5, 1980, now abandoned.

BACKGROUND OF THE INVENTION

(1) Field of the Invention

The present invention relates to a film-paper fiber layer laminate and a process for the preparation thereof. More particularly, the present invention relates to a laminate of a film and a very thin paper fiber layer which can hardly be prepared according to the contemporary paper-making techniques or which, if prepared, cannot be bonded to a film, and also to a process for the preparation of such laminate.

(2) Description of the Prior Art

As the conventional known method for imparting printability, recording property and graphic property to films, there can be mentioned (A) a method comprising oxidizing the surface of a film, (B) a method comprising forming convexities and concavities on the surface of a film and (C) a method comprising bonding a paper to a film. The method (A) includes a corona discharge method and a flame-treating method, and the method (B) includes a sand blast method, an etching method and a surface-coating method. However, each of the products obtained according to these known methods (A) and (B) is defective in that since each product is comprised of a film, an oil ink and an aqueous ink are not absorbed and a long time is required for drying inks. Furthermore, these conventional products readily repel inks and are poor in the ink-film adhesion and the dyeability. Products obtained according to the method (C) retain merits inherent in paper, such as printability, recording property and graphic property, but since the products comprise a relatively thick paper having a basis weight larger than about 20 g/m² and a film bonded thereto, the transparency and pliability inherent in the film are lost and the products come to have a stiffy touch. Furthermore, the products are readily curled by shrinkage or elongation of the paper.

BRIEF SUMMARY OF THE INVENTION

It is therefore a primary object of the present invention to provide a film-paper fiber layer laminate which retains merits of both film and paper and a process for the preparation thereof.

Another object of the present invention is to provide a pliable film-paper fiber layer laminate which is excellent in printability, recording property and transparency and has a high tearing strength, and a process for the preparation thereof.

Still another object of the present invention is to provide a film-paper fiber layer laminate suitable as a tracing paper, a computer paper or a recording paper for a printer or measuring device, and a process for the preparation thereof.

A further object of the present invention is to provide a process in which a film-paper fiber layer laminate having the above-mentioned characteristics can be prepared at low costs very simply.

Other objects, features and advantages of the present invention will be apparent from the following detailed description made with reference to the accompanying drawings.

In accordance with the present invention, these objects can be attained by a film-paper fiber layer laminate comprising a film and a very thin paper fiber layer bonded to the film. Furthermore, according to the present invention, this film-paper fiber layer laminate is prepared by a process comprising bonding films to both surfaces of a paper so that the adhesive bond strength between the film and paper is higher than the failure strength of the fiber layer of the paper and separating the films by delamination to leave a very thin paper fiber layer on each film.

Namely, the present invention provides a film-paper fiber layer laminate obtained by bonding films to both surfaces of a paper to form a film-paper-film laminate and separating the films by delamination to cause fracture in the paper, and a process for the preparation of this laminate.

In the film-paper fiber layer laminate according to the present invention, since the paper fiber layer bonded to the film is very thin and the basis weight is reduced to a level of 5 to 15 g/m², which can hardly be attained according to the conventional paper-making techniques, the transparency of the film as the base is not lost and reduction of the dimension stability or curling of the laminate owing to elongation or shrinkage of the paper fiber layer is prevented. Furthermore, no stiff touch is given the laminate and the tearing strength of the film is completely retained.

Moreover, since the basis weight of the paper fiber layer is 5 to 15 g/m², blurring of a printing ink or the like is not caused and an applied ink is readily dried, and good printability, recording property and graphic property inherent in the paper are retained.

Accordingly, the film-paper fiber layer laminate according to the present invention is very suitable and valuable as a tracing paper and can broadly be used as a computer tape or a recording paper for a printer or measuring device. Furthermore, since the film-paper fiber layer laminate of the present invention can be prepared by a very simple process as described hereinbefore, the manufacturing cost can remarkably be reduced and mass production can easily be accomplished.

DETAILED DESCRIPTION OF THE PREFERRED EMBODIMENTS

The film-paper fiber layer laminate according to the present invention will now be described with reference to FIG. 1.

Figure 1:
FIG. 1 is an enlarged view showing the section, in the thickness direction, of the film-paper fiber layer laminate according to the present invention.

Referring to FIG. 1, a film-paper fiber layer laminate 1 of the present invention comprises a film 2 and a paper fiber layer 3 bonded thereto. This laminate 1 is prepared according to the process described hereinafter, and in this laminate 1, the basis weight of the paper fiber layer 3 bonded to the film 2 is ordinarily 5 to 15 g/m² and preferably 5 to 8 g/m². In the present invention, the basis weight of the paper fiber layer 3 is adjusted within the above-mentioned range for the following reasons.

When the section of a printed or written paper is observed under a microscope, it is seen that the basis weight of the paper fiber layer necessary for permeation of a printing ink or the like is 5 to 8 g/m². In other words, the minimum basis weight of the paper fiber layer, which is required to impart characteristics of paper, such as printability, recording property and graphic property, to the laminate, is 5 to 8 g/m². If the basis weight of the paper fiber layer 3 is smaller than 5 g/m², a printing ink or the like permeates through the paper fiber layer 3 and arrives at the surface of the film, with the result that blurring of the ink is caused or a long time is required for drying of the ink.

The minimum basis weight that can be attained according to the contemporary paper-making technique is about 15 g/m². Accordingly, if the basis weight of the paper fiber layer 3 is larger than 15 g/m², the laminate becomes equivalent to a product obtained by bonding a paper to a film, and the transparency inherent in the film and the dimension stability are lost in the resulting laminate and the laminate becomes stiff and free of pliability.

In the present invention, the kind of the film-constituting material is not particularly critical. For example, there can be used a polyvinyl chloride film, a polyethylene film, a polypropylene film, a polystyrene film, a polyacetate film, a polycarbonate film, a polyester film, a polyamide film, a polyimide film and a chlorinated rubber film.

Any of adhesives can be used for bonding the film 2 to the paper fiber layer 3, so far as the requirement that the adhesive bond strength between the film and paper is higher than the failure strength of the paper fiber layer is satisfied. For example, there can be used copolymers of vinyl acetate, ethylene, acrylonitrile, vinyl chloride and the like, rubber type adhesives such as natural rubbers, butyl rubbers, nitrile rubbers, neoprene rubbers and chloroprene rubbers, epoxy type adhesives, unsaturated polyester type adhesives, and copolycondensed saturated polyester type adhesives. These adhesives may be used singly or in the form of a mixture of two or more of them.

The process for the preparation of the film-paper fiber layer laminate shown in FIG. 1 will now be described with reference to FIGS. 2 and 3.

Figure 2:
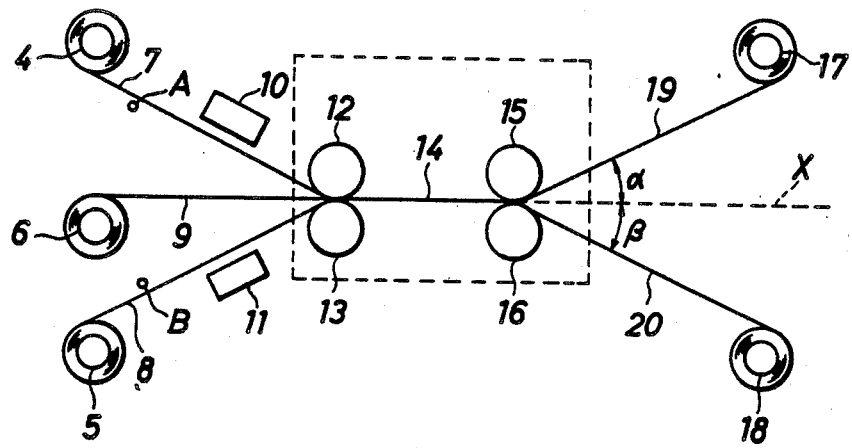
FIG. 2 is a flow sheet showing one embodiment of the process for the preparation of film-paper fiber layer laminate according to the present invention.

Referring to FIG. 2, films are wound on rolls 4 and 5, respectively, and a paper is wound on a roll 6. Films 7 and 8 are taken out from the rolls 7 and 8 and an adhesive is supplied to one surface each of the films 7 and 8 at points A and B. The adhesive-applied films are heated by driers 10 and 11 to remove the solvent from the adhesive. A paper 9 is taken out from the roll 6, and the films 7 and 8 are dry-laminated on both surfaces of the paper 9 by means of rolls 12 and 13 to form a film-paper-film laminate 14.

In the present invention, it is important that the adhesive applied at the points A and B should have such a property that the adhesive bond strength between the paper 9 and the film 7 or 8 is higher than the failure strength of the fiber layer of the paper 9.

The film-paper-film laminate 14 is then cooled by rolls 15 and 16, and the films are separated from the paper by delamination. More specifically, when the films of the film-paper-film laminate 14 are peeled at an optional peeling speed in such a manner that the angle α and β of the peeling directions to the central peeling line X in the obtained film-paper fiber layer laminates 19 and 20, respectively, are equal to each other, the tearing stress is concentrated substantially on the center of the thickness of the fiber layer of the paper 9, with the result that fracture of the fiber layer of the paper 9 is caused substantially at the center of the thickness thereof and the fiber layer is divided into two parts. Thus, film-paper fiber layer laminates 19 and 20 which are substantially equal in the thickness of the fiber layers bonded to the film bases 7 and 8 are obtained.

If the adhesive bond strength between the film and paper is lower than the failure strength of the paper fiber layer, fracture is not caused by the above peeling operation, but the bonded film is merely separated from the paper and no film-paper fiber layer laminate is obtained.

Figure 3:
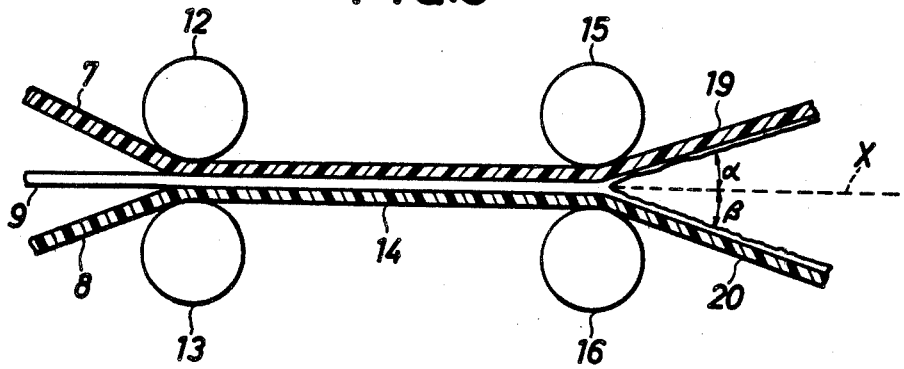
FIG. 3 is an enlarged view showing a portion surrounded by dot lines in FIG. 2.

FIG. 3 is an enlarged view, showing a portion surrounded by dot lines in FIG. 2. Formation of the film-paper-film laminate and formation of film-paper fiber layer laminates 19 and 20 by separation of films 7 and 8 by delamination are illustrated more definitely in FIG. 3.

The basis weight of the paper 9 supplied from the roll 6 is 15 to 30 g/m², preferably 15 to 20 g/m². A paper having a basis weight smaller than 15 g/m² can hardly be formed according to the contemporary paper-making technique. If a paper having a basis weight larger than 30 g/m² is used, the basis weight of the paper fiber layer of a film-paper fiber layer laminate obtained by the above-mentioned delamination is larger than about 15 g/m² and the obtained laminate becomes equivalent to a product obtained by bonding a film to a paper, and in this case, no good results can be obtained as pointed out hereinbefore. The kind of the paper that is used in the present invention is not particularly critical in the present invention, so far as the basis weight is in the range of from 15 to 30 g/m². For example, any of ordinary machine-made papers and Japanese papers can be used. Even if a Japanese paper in which the length of paper pulp fibers is relatively long is used, there can be obtained a film-paper fiber layer laminate having a smooth surface, which can directly be put into practical use. Bonding of a paper to a film may be accomplished by either dry lamination or wet lamination. However, the dry lamination process is preferred because the adhesive permeates into the interior of the paper in case of the wet lamination process.

In the embodiment shown in FIG. 2, a film-paper fiber layer laminate having a paper fiber layer bonded to one face of a film is prepared. According to the present invention a film-paper fiber layer laminate having paper fiber layers bonded to both surfaces of a film, respectively, can similarly be prepared.

More specifically, film-paper fiber layer laminates prepared in the same manner as described above are set on the rolls 4 and 5 shown in FIG. 2, respectively, so that the film layer of each laminate is located on the inner side, and a paper 9 is set on the roll 6. If the bonding operation is carried out in the above-mentioned manner, the film-paper fiber layers are bonded to both surfaces of the paper 9, respectively, and a paper fiber layer-film-paper-film-paper fiber layer laminate is obtained as the laminate 14.

If delamination is carried out between the paper and film in the so obtained laminate 14 in the above-mentioned manner, fracture is caused in the fiber layer of the paper located at the center of the laminate, and paper fiber layer-film-paper fiber layer laminates are obtained as the laminates 19 and 20.

The present invention will now be described in detail with reference to the following Examples that by no means limit the scope of the invention. It must be noted that various modifications and changes may be made without departing from the spirit and scope of the present invention.

EXAMPLE

An adhesive having a composition shown below was coated on one surface of a biaxially stretched polyethylene terephthalate film having a thickness of 25μ, and the coated film was dried to remove the solvent of the adhesive.

| | |
|---|---|
| Copolycondensed saturated polyester | 15 parts by weight |
| Epoxy resin | 3 parts by weight |
| Isocyanate prepolymer | 2 parts by weight |
| Solvent (7/2/1 mixture of toluene/methylethyl ketone/dioxane) | 80 parts by weight |

The above-mentioned polyesters films coated with the above adhesive were dry-laminated on both the front and the back surfaces of a Japanese paper having a basis weight of 15.6 g/m², a thickness of 28μ and a density of 0.56. After cooling, the films on both front and back surfaces of the obtained film-paper-film laminate were separated by delamination in such a manner that both peeling angles (α and β in FIGS. 2 and 3) were equal to each other. At this step, the peeling speed was adjusted to 100 m/min and by keeping the peeling angles equal to each other, the stress produced on peeling of the films were caused to act substantially on the center of the thickness of the paper fiber layer.

Thus, film-paper fiber layer laminates, each comprising the polyester film and the paper fiber layer having a basis weight of 6.5 to 8.5 g/m², which was bonded to the film, were obtained. The deviation of the thickness of the paper fiber layer was about 2.0 g/m² as calculated as the basis weight.

The surface of the paper fiber layer of each laminate was so smooth that printing, writing or recording could directly be performed on the surface of the paper fiber layer of the laminate.

COMPARATIVE EXAMPLE

Comparison tests were made on the film-paper fiber layer laminate of the present invention, prepared in the above Example, a Japanese paper-film bonded laminate as a conventional product and a sand-matted film having a thickness of 50μ. The obtained results are shown in Table 1 below.

TABLE 1

| Test Items | Laminate of Invention | Film-Japanese Paper Bonded Laminate | Sand-Matted Film |
|---|---|---|---|
| Paper Thickness (μ) | 14 | 28 | — |
| Film Thickness (μ) | 25 | 25 | 50 |
| Laminate Thickness (μ) | 39 | 53 | — |
| Ink-Adhering Property | | | Δ |
| Dry-to-touch Time (seconds) | <5 | <5 | >10 |
| Curling | | X | |
| Transparency (%) | 71.6 | 60.4 | 77.8 |
| Stiffness (mg) | 404 | 744 | 515 |

The ink-adhering property, dry-to-touch time, curling, transparency and stiffness were evaluated according to the following methods.

Ink-adhering property:

A letter was written on a sample with an oil ink or aqueous ink, and the written surface was rubbed 10 times by an eraser and the degree of reduction of the density of the written letter was observed with the naked eyes. The symbol "○" in the Table indicates a good ink-adhering property and symbol "Δ" indicates a slightly insufficient ink-adhering property.

Dry-to-touch time:

A letter was written on a sample, and the written surface was rubbed with a finger at intervals of one second. The time required for the ink to be dried to such an extent that the ink was not blurred by rubbing with the finger was measured.

Curling:

A sample was allowed to stand still for 10 minutes in a conditioning chamber maintained at a temperature of 25° C. and a relative humidity of 45, 65 or 85%, and occurrence of curling was checked. Symbol "○" indicates that curling was not caused and symbol "X" indicates that curling was caused.

Transparency:

The transparency was determined according to the method of JIS P-8138 and calculated according to the formula, Transparency (%)=100−(Hunter opacity value).

Stiffness:

The stiffness was determined by using a Gurley stiffness tester.

From the results shown in Table 1, it will readily be understood that the laminate of the present invention is excellent over the conventional film-paper bonded laminate and the surface-processed sand-matted film in all of the ink-adhering property, curling, dry-to-touch time, transparency and stiffness.

Incidentally, it must be noted that these Examples shall be interpreted as being illustrative of the technical contents of the present invention and not in a sense of limiting the scope of the invention.

What is claimed is:

1. A film-paper fiber layer laminate comprising a film selected from the group consisting of a polyvinyl chloride film, a polyethylene film, a polypropylene film, a polystyrene film, a polyacetate film, a polycarbonate film, a polyester film, a polyamide film, a polyimide film and a chlorinated rubber film; and a thin paper fiber layer bonded to the film, the basis weight of the paper fiber layer being 5 to 15 g/m².

2. A film-paper fiber layer laminate as set forth in claim 1, wherein the basis weight of the paper fiber layer is 5 to 8 g/m².

3. A film-paper fiber layer laminate as set forth in claim 1 or 2, wherein the paper fiber layer is a fiber layer of a Japanese paper or machine-made paper.

* * * * *